United States Patent [19]

Katsuragi

[11] Patent Number: 5,024,553

[45] Date of Patent: Jun. 18, 1991

[54] NON-WATER-SPRINKLING TYPE SNOW MELTING METHOD AND SYSTEM

[75] Inventor: Kohei Katsuragi, Yamagata, Japan

[73] Assignee: Nihon Chikasui Kaihatsu Kabushiki Kaisha, Yamagata, Japan

[21] Appl. No.: 368,404

[22] Filed: Jun. 19, 1989

[30] Foreign Application Priority Data

Aug. 8, 1988 [JP] Japan ................... 63-197689

[51] Int. Cl.$^5$ ............................. E01C 11/26
[52] U.S. Cl. ........................ 404/71; 165/45; 404/72; 405/131; 405/234
[58] Field of Search ............ 404/71, 72; 405/61, 405/131, 234; 126/343.5 R; 165/45

[56] References Cited

U.S. PATENT DOCUMENTS

| | | | |
|---|---|---|---|
| 1,581,088 | 4/1926 | Pearce | 405/131 |
| 2,637,531 | 5/1953 | Davidson | 165/45 |
| 3,195,619 | 7/1965 | Tippmann | 405/234 X |
| 3,236,991 | 2/1966 | Graham et al. | 404/41 X |
| 3,521,699 | 7/1970 | Van Huisen | 165/45 X |
| 4,139,321 | 2/1979 | Werner | 405/154 |
| 4,452,303 | 6/1984 | Bontje | 165/142 |
| 4,693,300 | 9/1987 | Adachi | 165/1 |

*Primary Examiner*—William P. Neuder
*Attorney, Agent, or Firm*—Ladas & Parry

[57] ABSTRACT

An underground water warmed by the geothermy in an aquifer is pumped up by a pumping means disposed in a pump-up well and the pumped up underground water is introduced into a heat exchanger located in the pump-up well near the opening thereof. The heat exchanger is connected to a heat radiating pipe laid under a road or a building structure on the ground through feed and return conduits. An antifreezing fluid is filled in the heat radiating pipe and circulates through the heat radiating pipe and the heat exchanger through the conduits. The antifreezing fluid warmed in the heat exchanger by the heat exchanging operation stores the heat in the road and transfers the heat to the snow on the ground during the passing through the heat radiating pipe by the heat radiating operation, whereby snow lying on the road is melted without sprinkling water. The underground water cooled after the heat exchanging operation is discharged from the heat exchanger to be introduced into a water returning artesian well to store the water or to be discharged into a public discharge channel.

13 Claims, 4 Drawing Sheets

NON-WATER-SPRINKLING TYPE SNOW MELTING METHOD AND SYSTEM

BACKGROUND OF THE INVENTION

This invention relates to non-water-sprinkling type snow melting method and system, and, more particularly, to a method and system for melting snow lying on roads or building structures in a cold snowy area without sprinkling water, wherein a heat exchanging means is provided in an artesian well at a level of the underground to improve heat exchanging efficiency, the heat exchanging means being connected to a heat radiating pipe means laid under the roads or building structures on the ground through conduits, and an antifreezing fluid is circulated through the heat exchanging means, the conduits and the heat radiating pipe to prevent the heat radiating pipe from being damaged due to the freezing thereof.

In the known art of this field, there is provided a snow melting system of non-water-sprinkling type, for example, as disclosed in Japanese Patent Laid-open (Kokai) No. 62-206,104 (206,104/1987), in which underground water warmed by geothermy is pumped up by a pumping means from within one artesian well as a pump-up well and fed to another artesian well as a water returning well through a conduit and a heat exchanging means disposed on the ground. A heat radiating pipe or pipes are laid under the road on the ground and the antifreezing fluid filled in the heat radiating pipe is circulated through the heat exchanging means disposed on the ground by the pumping means to carry out the heat exchanging operation to melt the snow which has fallen on the road and to prevent the same from freezing.

The snow melting system of the above described type, however, is accompanied by a significant problem such that, because the heat exchanging means is itself cooled by cold outside air in cold snowy season, and a relatively large amount of heat is lost, so that high heat exchanging efficiency is not expected. In addition, the location of the heat exchanging means requires much space on the ground.

In order to eliminate these problems, it may be required to apply a specific heat retaining or heat insulating installation or to further prepare a structure for accommodating the heat exchanging means so as not to cool the same. This, however, requires more complication for the establishment and increased cost for arranging the snow melting system.

SUMMARY OF THE INVENTION

An object of this invention is to eliminate the defects or drawbacks encountered in the prior art described above and to provide a method and system for melting snow lying on a road or a building structure on the ground without sprinkling water by utilizing the underground water warmed by the geothermy through the heat exchanging operation by means of a heat exchanger located in an artesian well.

This and other objects can be achieved according to this invention, in one aspect, by providing a method of melting snow lying on a road or a building structure on a ground by utilizing underground water warmed by the geothermy in a deep region of an artesian well, the method comprising the steps of locating heat exchanging means in the artesian well and providing a heat radiating means filled with an antifreezing fluid under the road or building structure on the ground, the heat exchanging means being connected to the heat radiating means so as to constitute a closed circulation arrangement for the antifreezing fluid, pumping up the underground water stored in the deep region in the artesian well, carrying out heat exchanging operation in the heat exchanging means between the pumped up underground water and the antifreezing fluid, feeding the antifreezing fluid warmed after the heat exchanging operation to the heat radiating means, carrying out heat radiating operation during the flowing of the antifreezing fluid through the heat radiating means, and returning the antifreezing fluid to the heat exchanging means.

In another aspect, according to this invention, there is provided a system for melting snow lying on a road or a building structure on a ground by utilizing underground water warmed by geothermy in a deep region in an artesian well, the system comprising pumping means disposed in the artesian well for pumping up the underground water, heat exchanging means disposed in the artesian well above the pumping means for carrying out a heat exchanging operation by utilizing the pumped up underground water, and heat radiating means filled with an antifreezing fluid and laid under the road or building structure on the ground, the heat radiating means being connected to the heat exchanging means so that the antifreezing fluid circulates through the heat exchanging means and the heat radiating means by way of feed and return conduits.

In a preferred embodiment, the underground water cooled after the heat exchanging operation is discharged from the heat exchanging means into another artesian well as a water returning well disposed apart from the first mentioned well through a conduit. The underground water introduced into the returning well is thereafter stored in a deep region therein for the use in the next cold snow season. The underground water cooled after the heat exchanging operation is otherwise discharged into a public discharge channel.

According to embodiments of this invention, the underground water warmed by the geothermy in the deep region, i.e. an aquifer, of a pump-up well is introduced into the heat exchanger located in the pump-up well to effectively transfer the heat of the underground water to the antifreezing fluid filling the heat radiating pipe laid under the road or building structure on the ground. The heat of the warmed antifreezing fluid is stored in the road or building structure on the ground so that the snow lying on the road can be melted without sprinkling water by the heat radiated from the warmed antifreezing fluid during the passing through the heat radiating pipe. The antifreezing fluid after the heat radiating operation returns to the heat exchanger, thus establishing the closed circulation of the antifreezing fluid. The underground water cooled after the heat exchanging operation is discharged into another artesian well as a water returning well and stored therein or into a public discharge channel.

DESCRIPTION OF THE PREFERRED EMBODIMENTS

Preferred embodiments of non-water-sprinkling type snow melting method and system according to this invention will be described hereunder in detail with reference to the accompanying drawings.

Figure 1:
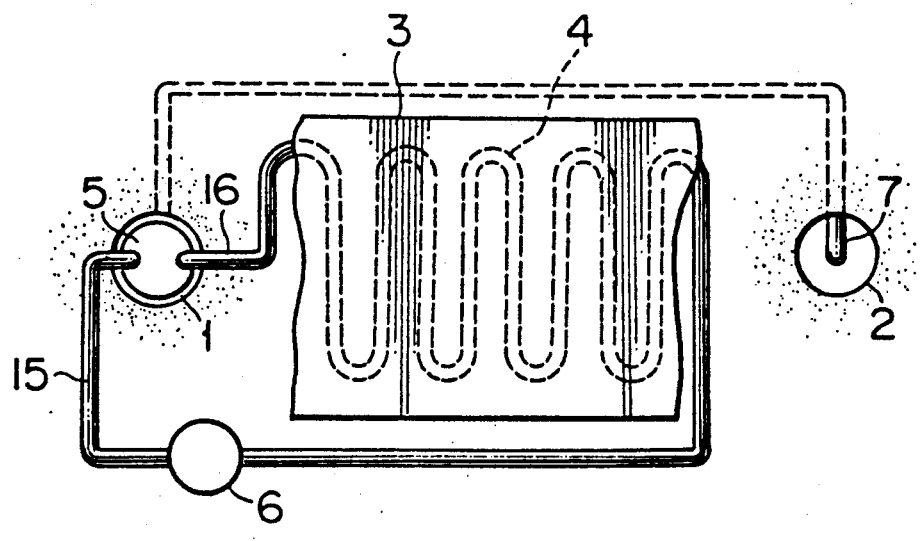
FIG. 1 is a plan view showing one embodiment of the snow melting system according to this invention.
Figure 2:
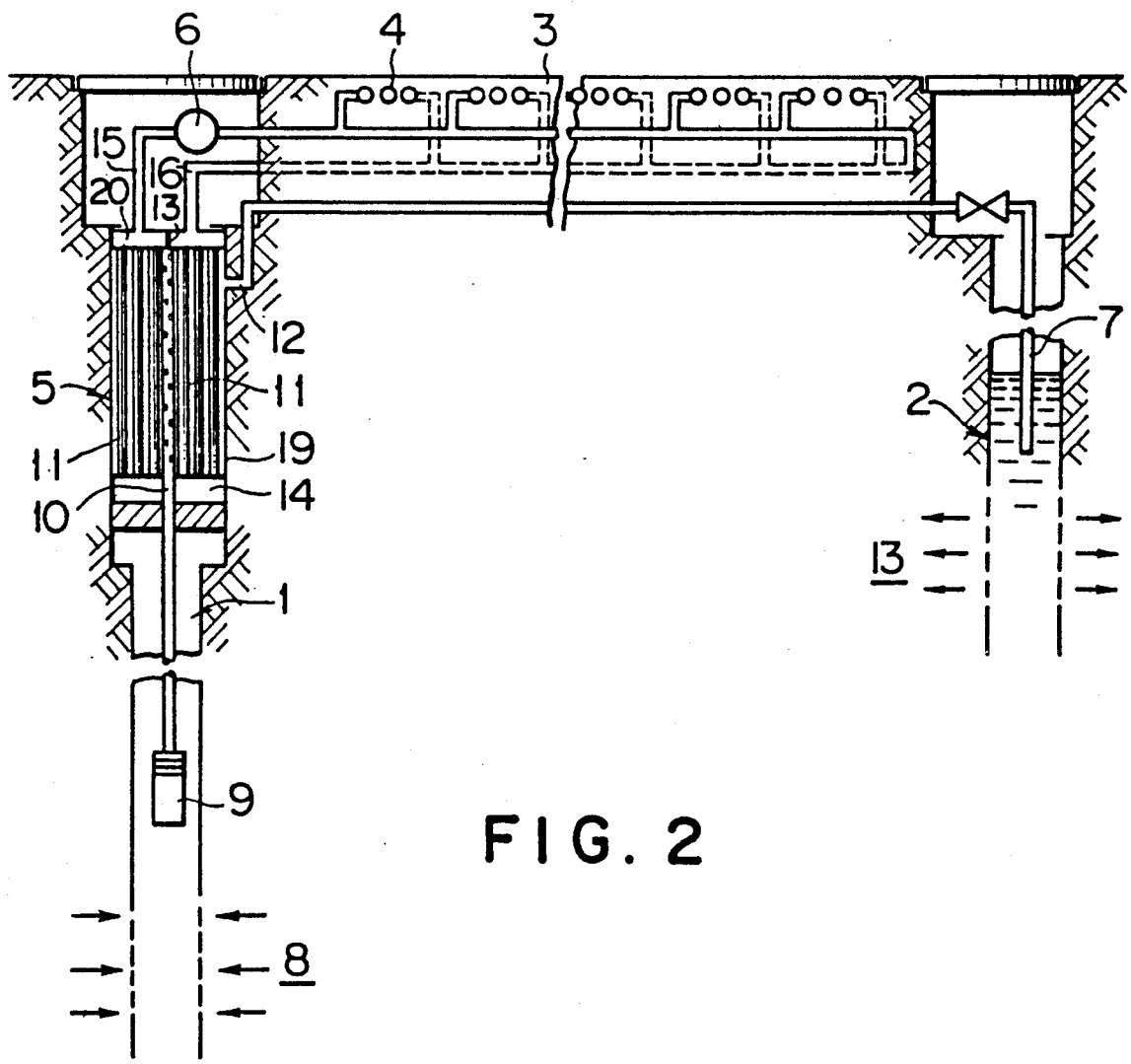
FIG. 2 is an elevational view, partially in vertical section, of the system shown in FIG. 1.

FIGS. 1 and 2 represent a case in which the principle of the snow melting system according to this invention is used for melting and removing snow lying on a road. Referring to these figures, two artesian wells 1 and 2 are bored into the ground, one 1 being a water pump-up well having a depth of from about 50 to 200 meters from the ground surface and the other 2 being a water returning well having a depth of more than two-thirds of that of the pump-up well 1. The distance between the locations of these wells 1 and 2 is from about 30 to 150 meters. A heat radiating pipe or pipes 4 are embedded below a road surface 3 between two wells 1 and 2 in, for example, a serpentine form as shown in FIG. 1, parallel form, spiral form or zig-zag form. The heat radiating pipe 4 may be laid under the road, the bed of a railway track, the runway of an air port, or other building structures on the ground such as a bridge on which snow falls. The heat radiating pipe 4 arranged in the form described above is connected to a heat exchanger 5 located in the pump-up well 1 at a proper level not far from the opening of the well 1, through a circulation pump 6 installed in a feed conduit 15 connecting the heat exchanger 5 and the heat radiating pipe 4 to circulate an antifreezing fluid filling the pipe 4. The pipe 4 is connected to the heat exchanger 5 through a return conduit 16.

Figure 3:
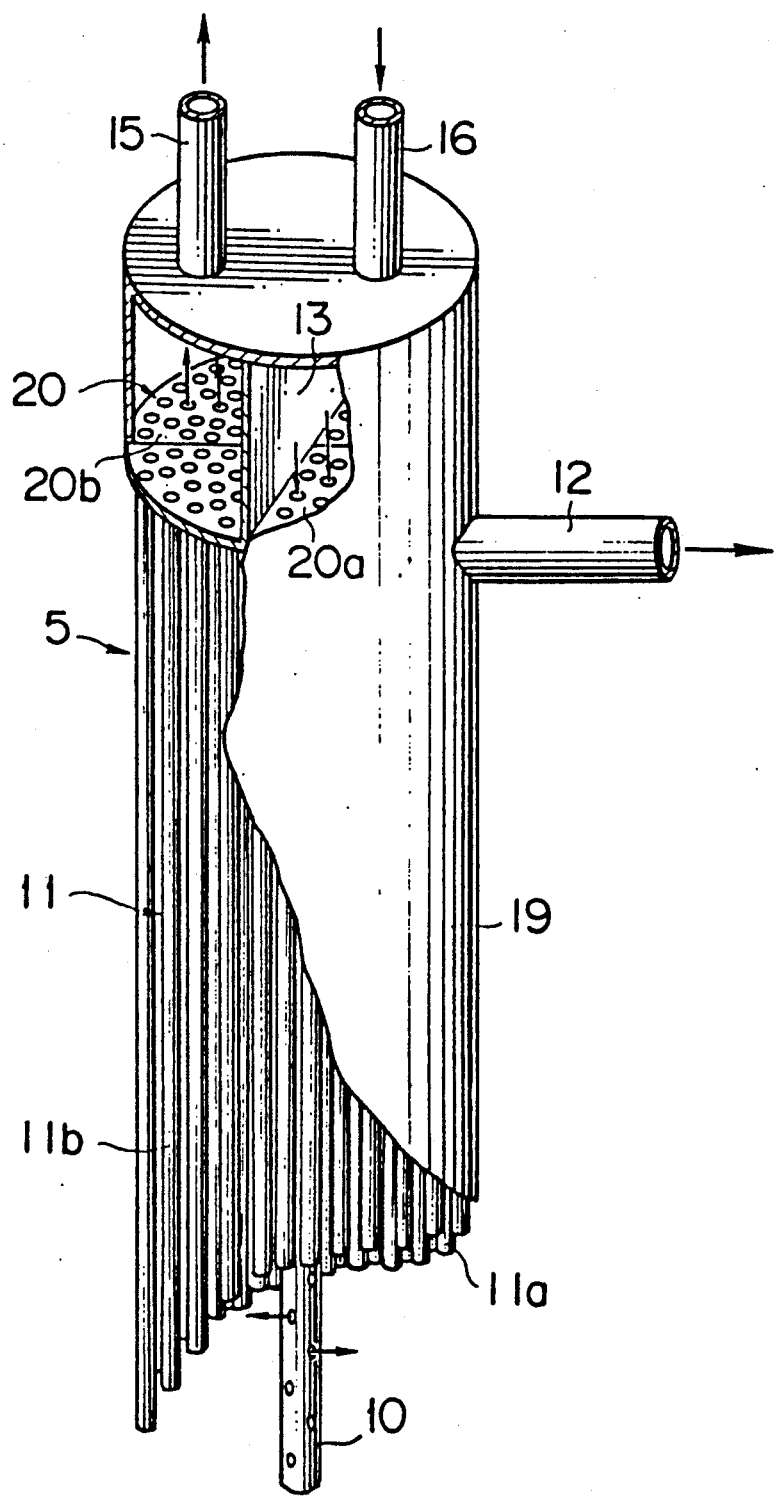
FIG. 3 is a fragmentary perspective view, partially broken away, of a heat exchanger used in the system shown in FIG. 1.

A pumping means such as a pump 9 is located in the well 1 at a deep portion below the heat exchanger 5 for pumping up the underground water stored in the aquifer 8. The underground water warmed by the geothermy is pumped upwardly through a tube 10 having a portion inserted into the heat exchanger 5. The portion of the tube 10 inserted into the heat exchanger 5 is provided with a number of perforations through which the pumped-up underground water is ejected outwards against a plurality of heat exchanger tubes 11 extending vertically in parallel relation to carry out the heat exchanging operation. The upper ends of the heat exchanger tubes 11 are opened into a space 20 which is formed in an upper portion of the heat exchanger 5 and communicates with the heat radiating pipe 4. The lower ends of the heat exchanger tubes 11 are connected to a lower header 14. As shown in FIG. 3, the space 20 is divided into two sections 20a and 20b by a partition plate 13.

After the heat exchanging operation in the heat exchanger 5, the underground water flows out of the heat exchanger through an overflow tube 12 connected thereto at an upper portion thereof to the water returning well 2 through a conduit which is connected to a returning tube 7 having the lowermost end inserted into the reduction well 2 as shown in FIG. 2.

As illustrated in detail in FIG. 3, the perforated portion of the tube 10 through which the underground water is ejected extends substantially in the central portion of the heat exchanger 5. A number of the heat exchanger tubes 11 are arranged around the perforated portion of the tube 10 so as to vertically and parallelly extend with spaces therebetween. The tube portion and the heat exchanger tubes 11 are enclosed in an outer casing 19 of the heat exchanger 5. The heat exchanger tubes 11 are divided into a plurality of, at least two, groups of tubes 11a and 11b such that the antifreezing fluid flows downwardly through some groups (or one group) of the heat exchanger tubes 11a and then flows upwardly through the other group (or groups) of the heat exchanging tubes 11b. Namely, the antifreezing fluid warmed by the underground water while passing through the tubes 11a and 11b through the heat exchanging operation flows upwardly, and the antifreezing fluid cooled by the heat radiating operation on the ground flows downwardly into the heat exchanger. Both the ends of the respective heat exchanger pipes are opened into the space 20 and the header 14 located in the upper and lower portions of the heat exchanger, whereby the antifreezing fluid filling the heat radiating pipe 4 is circulated through the heat exchanger tubes 11a and 11b, the heat radiating pipe 4 and the feed and return conduits 15 and 16.

According to the non-water-sprinkling type snow melting system of the character and the structure described hereinabove operates as follows.

Underground water of a temperature of from about 15° to 18° C. stored in the aquifer 8 at an underground level of from about 50 to 200 meters deep around the pump-up well 1 is pumped up by the pump 9 in the cold snow season when the outside air temperature is below 0° C. and snow falls. The pumped-up underground water is introduced into the heat exchanger 5 through the perforated portion of the tube 10 to be ejected through the perforations against the heat exchanger tubes 11. The antifreezing fluid flowing in the heat exchanger tubes 11 is warmed by the ejected underground water to a temperature of about 12° C. through the heat exchanging operation. The underground water after the heat exchanging operation is at a temperature of from about 7° to 8° C. and flows out of the heat exchanger 5 through the overflow tube 12 to be sent into the water returning well 2 through the water returning pipe 7. The underground water introduced into the returning well 2 is stored in the aquifer 13 at a deep underground level in the well 2 so as to enable utilization of the same in the next cold snow season. During the storage thereof in the aquifer 13, the temperature of the stored underground water is recovered to a temperature of from about 15° to 18° C.

The warmed antifreezing fluid directed upwardly flows through the space 20b of the heat exchanger 5 and is then fed into the heat radiating pipe 4 by the operation of the circulation pump 6 through the feed conduit 15 at a flow rate of from about 0.3 to 1.5 meters/sec. and the heat of antifreezing fluid warmed by the underground water is stored in the road, and then is transferred to the road, whereby the snow which has fallen and lies on the road and the like is melted and removed, and the freezing of the road surface can be effectively prevented due to the removal of the snow. The antifreezing fluid after the heat radiation flows through the return conduit 16 into the space 20a in the heat exchanger 5. The thus cooled antifreezing fluid flows down the heat exchanger tubes 11a which lead to the header 14 disposed at the lower portion of the heat exchanger 5, and the thus collected antifreezing fluid is again caused to flow upwardly through the heat exchanger tubes 11b, thus completing the circulation of the antifreezing fluid.

Figure 4:
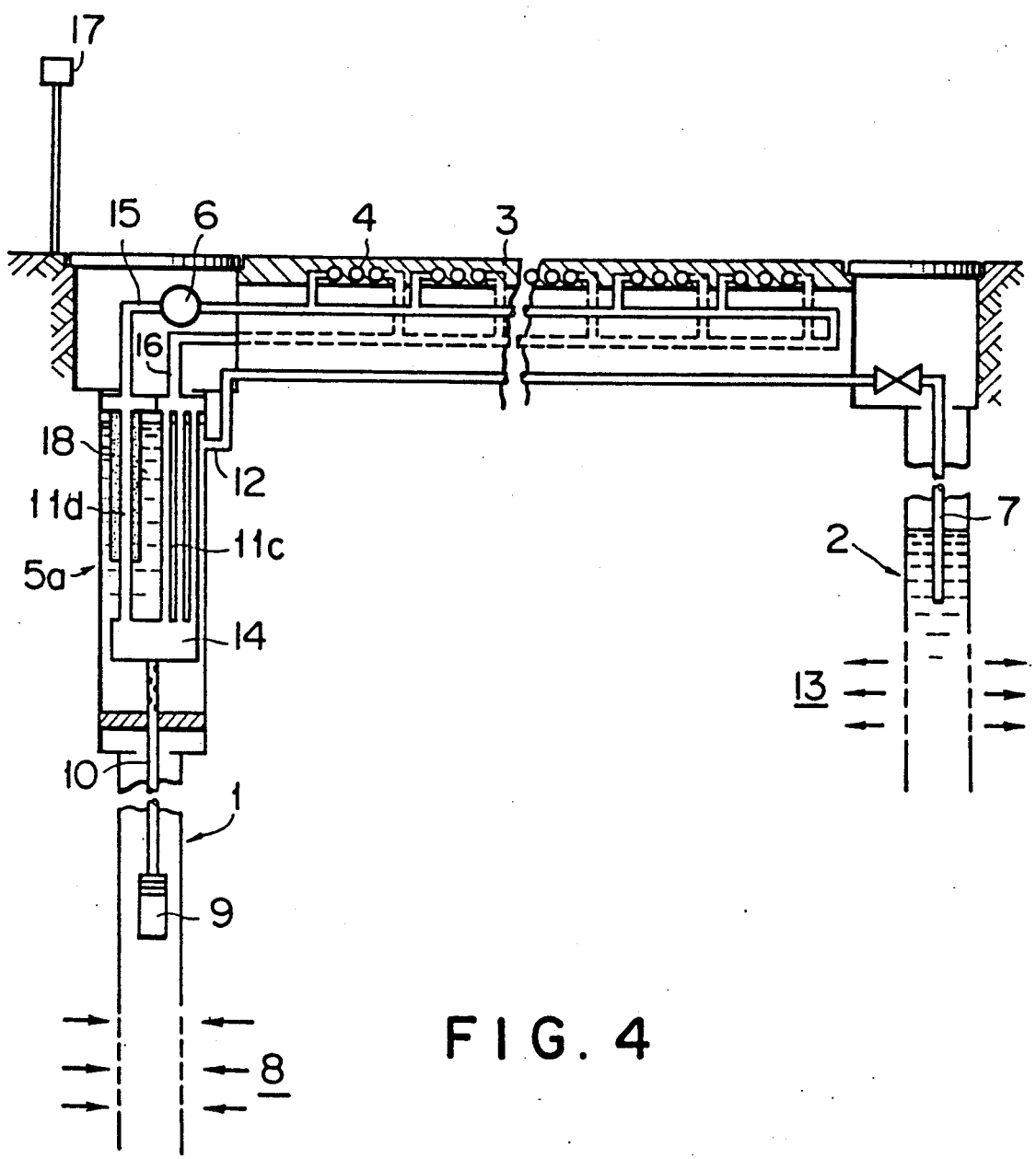
FIG. 4 is an elevational view, in vertical section, of another embodiment of the snow melting system according to this invention.
Figure 5:
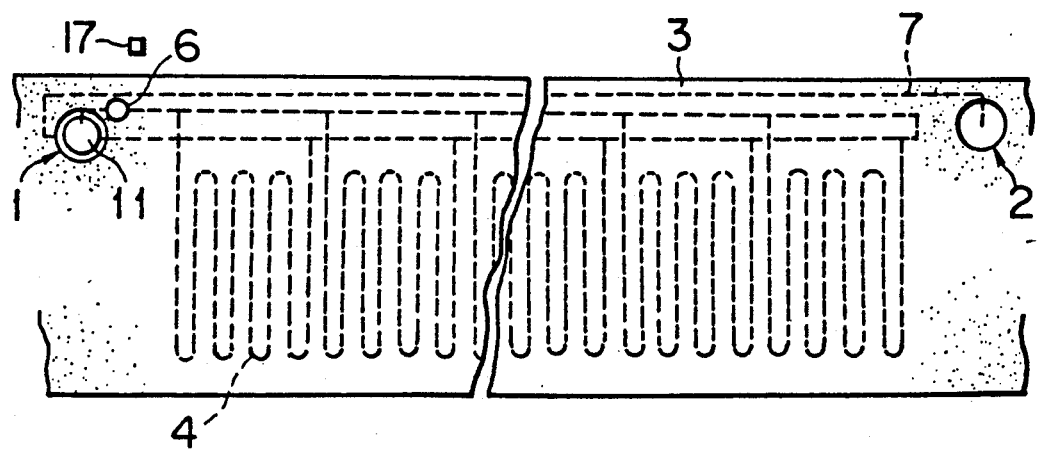
FIG. 5 is a plan view of the system of FIG. 4.

FIGS. 4 and 5 show a second embodiment of this invention.

Referring to FIGS. 4 and 5, like reference numerals are applied to members or portions corresponding to those shown in FIGS. 1 and 2, and these portions and members are operated in substantially the same manner as those attained by the embodiment represented by FIGS. 1 and 2.

Figure 6:
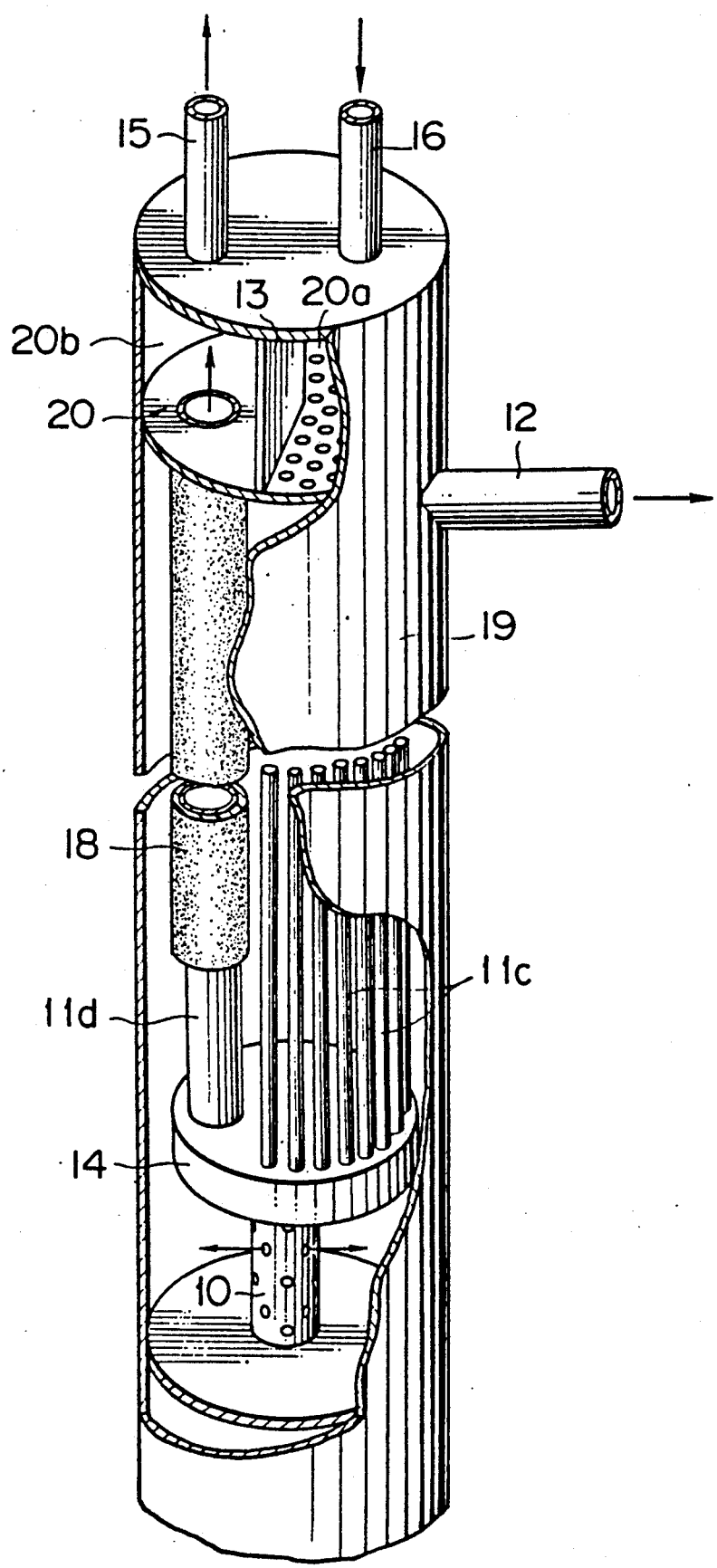
FIG. 6 is a perspective view, partially broken away, of a heat exchanger used in the system of FIG. 4.

The main difference between these embodiments resides in the construction of the heat exchanger 5a as clearly shown in FIG. 6.

In the second embodiment, the heat exchanger 5a includes a plurality of heat exchanger tubes 11 grouped into two, one 11c comprising a plurality of tubes each having a smaller diameter and the other 11d comprising a single tube having a larger diameter. These heat exchanger tubes 11c and 11d both extend vertically with a suitable space therebetween in an outer casing 19 of the heat exchanger 5a. In this embodiment, the antifreezing fluid flowing upwardly through the heat exchanger tube 11d is warmed by the underground water pumped up from the aquifer 8, and the antifreezing fluid utilized for the heat radiation flows downwardly through the heat exchanger tubes 11c. A cylindrical heat insulating member 18 is applied around the heat exchanger tube 11d for effective heat insulation.

In the embodiments described above, a sensor 17 shown in FIG. 4, for example, for detecting snow fall may be provided on the ground. The sensor 17 is operatively connected to the circulation pump 6 and the pump 9 so that an electric signal is transmitted from the sensor 17 to the circulation pump 6 and the pump 9 to start the operation thereof at a time when the sensor 17 detects snow fall at a temperature below 0° C.

It is preferred to form the heat radiating pipe 4 with a steel pipe or high polymer resin pipe having an inner diameter of from about 9 to 36 millimeters. The heat radiating pipe or pipes 4 are embedded below the road surface at a depth of from about 3 to 10 centimeters, and the heat radiating pipes 4 are arranged with a suitable space of from about 10 to 20 centimeters therebetween.

A wire net, not shown, may be arranged over or below the upper or lower portion of the heat radiating pipe 4 to improve the heat radiation.

In a further modified embodiment according to this invention, the water returning well 2 may be eliminated. In this embodiment, the underground water pumped up from the aquifer 8 is utilized for the heat exchanging operation in the heat exchanger 5 for warming the antifreezing fluid in the heat exchanging tubes 11, and the cooled underground water after the heat exchanging operation is drained into a public discharge channel or system without introducing it into the returning well. In this embodiment, the structures of the heat exchanger and the associated elements are substantially the same as those described in connection with the foregoing embodiments.

What is claimed is:

1. A system for melting snow lying on a structure overlying a ground surface by utilizing underground water warmed up by geothermy in a deep region in a first artesian well, comprising pumping means disposed in said artesian well for pumping up the underground water;

a second artesian well disposed apart from said first artesian well;

heat radiating means, filled with an anti-freezing fluid, adjacent said structure and said ground surface; and heat exchanging means disposed in said first artesian well, above said pumping means, for carrying out a heat exchanging operation by bringing the pumped up underground water in contact with the heat exchanging means and discharging said underground water to said second artesian well after the heat exchanging operation has been completed, said heat exchanging means comprising an outer casing, plurality of heat exchanger tube means disposed in said casing and extending vertically and parallelly and separated into first and second groups of heat exchanging tube means, said outer casing having in a lower portion thereof ejector pipe means for ejecting the pumped underground water into the casing and into contact with at least one of said groups of tube means, and header means disposed at a lower portion of said heat exchanging means so that lower ends of said heat exchanging tube means are all opened in the header means, an upper portion of said first group of the heat exchanging tube means being communicatively connected to said heat radiating means so that the anti-freezing fluid may flow upward through the first group of the heat exchanger tube means into the heat radiating means, an upper portion of said second group of the heat exchanging tube means being communicatively connected to said heat radiating means so that the anti-freezing fluid may flow downward from the heat radiating means into said upper portion, whereby anti-freezing fluid circulates through said groups of the heat exchanging tube means and said heat radiating means.

2. A system according to claim 1, wherein said first group of heat exchanger tube means is connected to said heat radiating means through a feed conduit and said second group of heat exchanger tube means is connected to said heat radiating means through a return conduit and wherein a circulation pump means is installed in one of said feed conduit and said return conduit so as to carry out circulation of said antifreezing fluid through said heat exchanger means and said heat radiating means by way of said feed and return conduits.

3. A system according to claim 2, wherein a sensor means is provided on the ground and operatively connected to said circulation pump means and said other pump means for pumping up the underground water such that said sensor means transmits a signal to said circulation pump means and said other pump means to operate the same when said sensor means detects snow fall at an outside air temperature below 0° C.

4. A system according to claim 1, wherein said circulation pump means is such as to circulate the antifreezing fluid at a flow rate of from about 0.3 to 1.5 meters/sec.

5. A system according to claim 2, wherein said first group of heat exchanger tube means comprises a plurality of heat exchanger tubes and said second group of heat exchanger tube means comprises a plurality of heat exchanger tubes, each of said first group of heat exchanger tubes having substantially the same diameter as that of each of said second groups of heat exchanger tubes.

6. A system according to claim 2, wherein said first group of heat exchanging tube means comprises a single heat exchanger tube and said second group of heat exchanger tube means comprises a plurality of heat exchanger tubes each having a diameter smaller than that of said single heat exchanger tube.

7. A system according to claim 6, wherein said single heat exchanger tube is wrapped by a heat insulating member.

8. A system according to claim 1, wherein said underground water pumping up means is disposed in the artesian well at a portion suitable for pumping up the underground water stored in a deep region having a depth of from about 50 to 200 meters from the ground surface.

9. A system according to claim 1, wherein said heat radiating means comprises a heat radiating pipe laid under the road or building structure in a serpentine form.

10. A system according to claim 8, wherein said heat radiating pipe is made of a steel material.

11. A system according to claim 8, wherein said heat radiating pipe is made of a high polymer resin material.

12. A system according to claim 1, wherein said other artesian well has a depth of more than two-thirds of the depth of the first mentioned artesian well.

13. A system according to claim 1, further comprising means for discharging the underground water cooled after the heat exchanging operation into a public discharge channel.

* * * * *